US011110950B2

(12) United States Patent
Hurd (10) Patent No.: US 11,110,950 B2
(45) Date of Patent: Sep. 7, 2021

(54) TWO-WHEELED VEHICLE DOLLY AND METHOD OF MOVING SAME

(71) Applicant: V & R LLC, Lone Tree, CO (US)

(72) Inventor: Robert Hurd, Portland, OR (US)

(73) Assignee: V & R LLC, Lone Tree, CO (US)

( * ) Notice: Subject to any disclaimer, the term of this patent is extended or adjusted under 35 U.S.C. 154(b) by 211 days.

(21) Appl. No.: 16/230,182

(22) Filed: Dec. 21, 2018

(65) Prior Publication Data

US 2019/0118843 A1 Apr. 25, 2019

Related U.S. Application Data

(62) Division of application No. 14/806,218, filed on Jul. 22, 2015, now Pat. No. 10,160,468.

(60) Provisional application No. 62/027,536, filed on Jul. 22, 2014.

(51) Int. Cl.
*B62B 5/00* (2006.01)

(52) U.S. Cl.
CPC ........ *B62B 5/0093* (2013.01); *B62B 2202/90* (2013.01); *B62B 2205/006* (2013.01)

(58) Field of Classification Search
CPC .......... B62B 5/0093; B62B 3/06; B62B 3/04; B62B 3/02
See application file for complete search history.

(56) References Cited

U.S. PATENT DOCUMENTS

| | | | | |
|---|---|---|---|---|
| 2,990,191 | A | * | 6/1961 | Black ................... B62B 5/0083 280/79.11 |
| 3,198,538 | A | | 8/1965 | Nowell |
| 4,696,484 | A | | 9/1987 | Casey |
| 4,846,484 | A | | 7/1989 | Nekola |
| 5,941,675 | A | | 8/1999 | Orr |
| 6,095,746 | A | * | 8/2000 | Bergin ................. B62B 5/0083 269/17 |
| 7,156,403 | B2 | * | 1/2007 | Abbott .................... B60P 3/122 280/79.11 |
| 7,275,753 | B1 | | 10/2007 | Ceccarelli et al. |
| 7,673,887 | B2 | | 3/2010 | Hassell |
| 7,815,201 | B2 | | 10/2010 | Ceccarelli, III et al. |
| 8,585,072 | B2 | | 11/2013 | Momaly |
| 2011/0170994 | A1 | | 7/2011 | Coombs et al. |

* cited by examiner

*Primary Examiner* — John D Walters
*Assistant Examiner* — James J Triggs (57) ABSTRACT

A dolly comprising a front segment and a rear segment, each with wheels at both ends thereof, wherein the wheels are movable between lowered and lifted settings, at least two connecting members between the front segment and the rear segment, and at least one towing ring on the front segment.

14 Claims, 11 Drawing Sheets

TWO-WHEELED VEHICLE DOLLY AND METHOD OF MOVING SAME

CROSS-REFERENCE TO RELATED APPLICATIONS

This application is a divisional application of U.S. patent application Ser. No. 14/806,218 entitled "TWO-WHEELED VEHICLE DOLLY AND METHOD OF MOVING SAME", filed on Jul. 22, 2015 and which claims priority to and the benefit of the filing of U.S. Provisional Patent Application No. 62/027,536, filed on Jul. 22, 2014, and the specifications and claims of these applications are incorporated herein by reference.

BACKGROUND OF THE INVENTION

Field of the Invention (Technical Field)

The present invention relates to two-wheeled vehicle dollies, and more particularly to motorcycle dollies which enable a single operator to lift and move a motorcycle without tipping it on its side.

Description of Related Art

Moving broken down two-wheeled vehicles, in particular motorcycles, has various challenges. Commercially available motorcycle dollies require either the front or rear wheel of the motorcycle to be driven or pushed up through a ramp to reach a support platform onto which the motorcycle can be secured for moving, e.g., to be pushed onto a tow truck. Motorcycles are unstable by nature and pushing a broken-down motorcycle onto even a small, sloped ramp is challenging. The operation requires at least two people to ensure the motorcycle does not tip over on its side, which could greatly damage it. Requiring two people to load the motorcycle onto the dolly defeats the purpose of having this piece of equipment. Not only that, pushing a large motorcycle, e.g., a Harley Davidson®, with a flat tire up a ramp of this type is virtually impossible, even for two people, not to mention dangerous. The challenges of loading a motorcycle onto a tow truck utilizing state of the art dollies are evidenced through the current costs associated with the operation, which, despite the motorcycle's smaller size, are more than double those of an automobile. Additionally, commercially available motorcycle dollies are very expensive, are very bulky, and although some do fold up into a more compact configuration for transportation, they still require significant storage space. There is a need for effective, versatile, motorcycle dollies that can take less storage space, and can be operated by a single person.

BRIEF SUMMARY OF THE INVENTION

The present invention is of a dolly comprising: a front segment and a rear segment, each with wheels at both ends thereof, wherein the wheels are movable between lowered and lifted settings; at least two connecting members between the front segment and the rear segment; and at least one towing ring on the front segment. In the preferred embodiment, each of the front and rear segments houses an axle to which the wheels are attached. Each of said connecting members can be disassembled. One or more lock pins connect sections of each connecting member. In one embodiment, the wheels are switchable between lowered and lifted settings independently of one another, and are preferably lockable into the lifted setting. In another embodiment, the wheels are switchable between lowered and lifted settings as pairs, preferably wherein connectors are secured to front and rear segments proximate the wheels to lock said wheels into the lifted setting, most preferably via chains.

The invention is also of a method for moving a two-wheeled or three-wheeled vehicle, the method comprising: providing a dolly as described above; securing a front wheel of the vehicle to the dolly; moving the wheels into their lifted settings; and moving the vehicle.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Embodiments of the present invention solve the above noted problems by providing dollies for two-wheeled vehicles that eliminate all problems and risks of injury to employees/customers, or motorcycle damage. Embodiments of the present invention lay flat on the ground (lowered configuration) and are quickly assembled from a broken down configuration, are connected to the motorcycle without having to touch the motorcycle or having to push or exert physical strain, and once the motorcycle is securely stabilized, by, for example, strapping it to the flat-laying apparatus, the wheels of the apparatus are able to descend down to lift the wheel of the motorcycle up with an easy stroke of the hand (apparatus' lifted configuration). This makes it possible for a single person to safely and effectively move a motorcycle, for example, to pull it onto a tow truck, and eliminates any risk of the motorcycle being tipped over while being handled. In addition, embodiments of the present invention have a highly compact configuration when disassembled for transportation.

Embodiments of the present invention comprise dollies for two-wheeled vehicles, and more particularly, dollies for motorcycles that allow a single person to lift and move a motorcycle unassisted.

Figure 6:
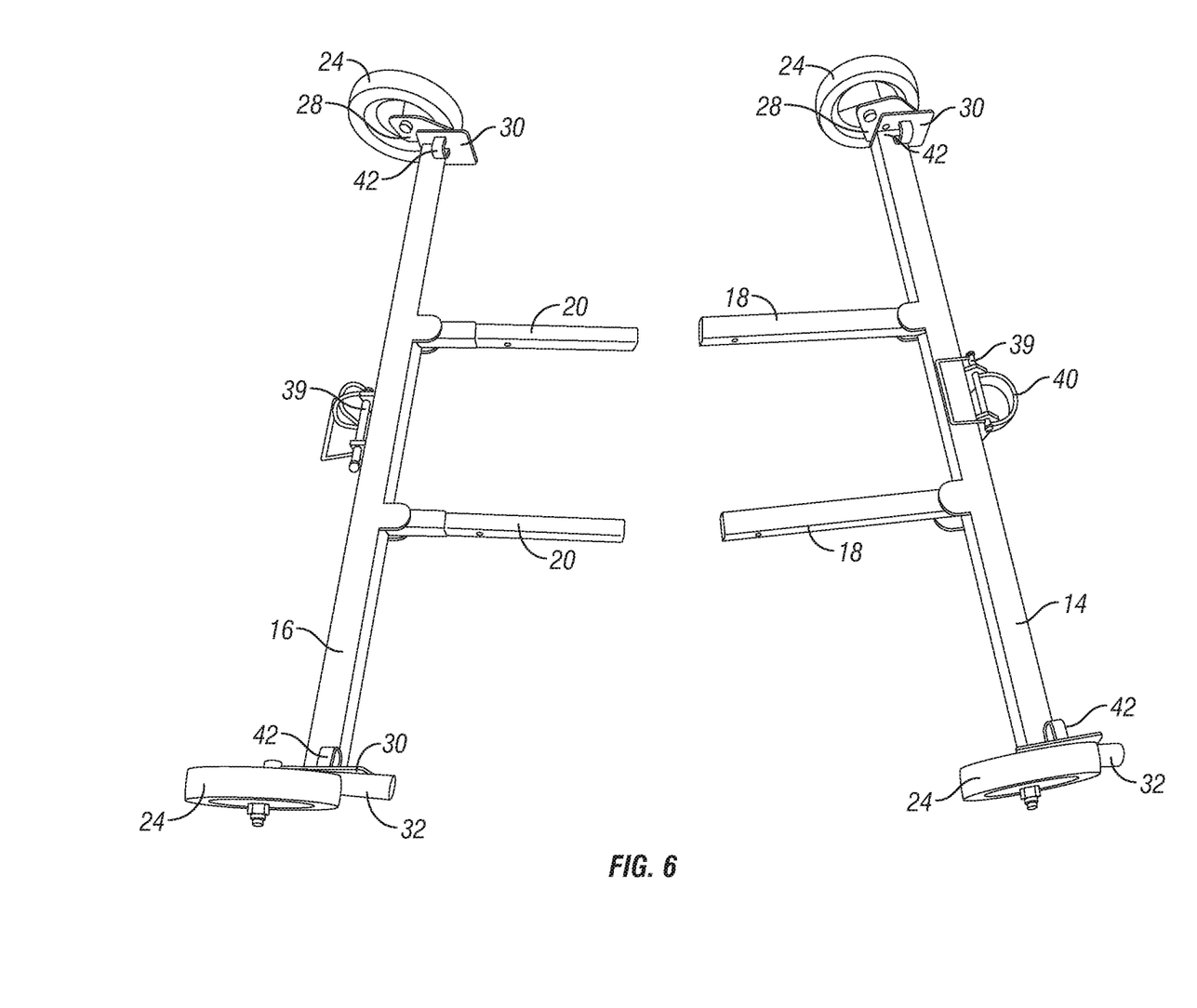
FIG. 6 is a left top perspective view of the apparatus of FIG. 4 wherein both front and rear components have their connecting members fully extended and aligned in front of their counterparts for assembly.
Figure 7:
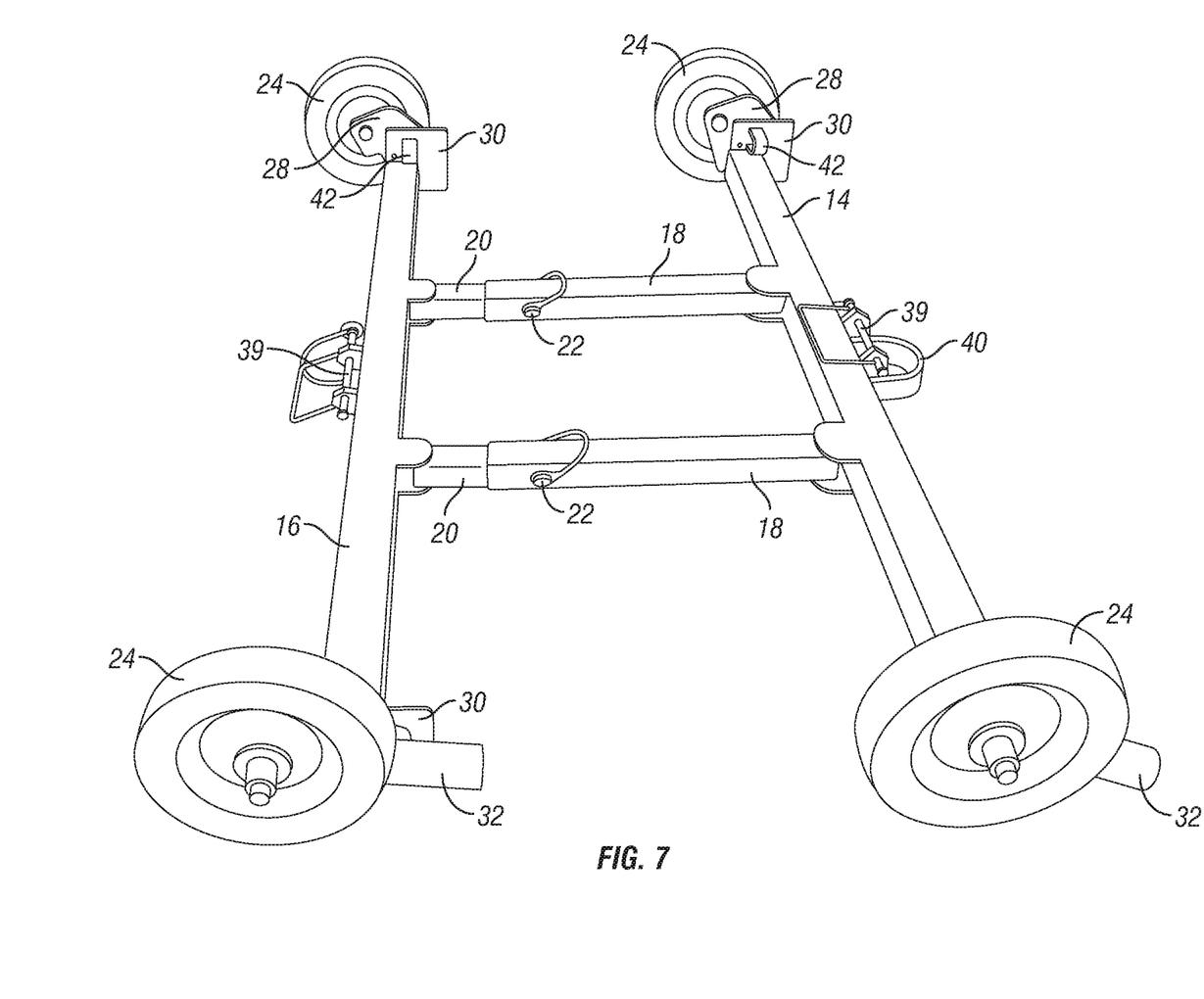
FIG. 7 is a left top perspective view of the apparatus of FIG. 4 in the lowered configuration, fully assembled and locked with lock pins.

Referring now to the Figures, in one embodiment, dolly 10 comprises frame 12, which is preferably formed when front segment 14 and rear segment 16 are assembled. Frame 12 can be fabricated of diverse suitable materials, which include but are not limited to metals such as tubular or solid steel, stainless steel, aluminum, and the like, plastic, wood, combinations thereof and the like. Preferably, front segment 14 comprises one or more preferably foldable connecting member 18 and rear segment 16 comprises one or more preferably foldable connecting member 20. In one embodiment, each segment comprises two connecting members that can attach to a corresponding counterpart to form frame 12. In one embodiment, connecting members 18 are manufactured of tubular steel that is larger in diameter than connecting members 20, as depicted in FIG. 6. Then connecting members 20 are inserted into connecting members 18 to assemble frame 12. Preferably, a locking mechanism is provided. For example, in one embodiment, the connecting members comprise matching perforations through which lock pins 22 are disposed. See FIG. 7. In a different embodiment, the apparatus comprises an automatic locking mechanism, for example, cam spring locks and the like.

Figure 10:
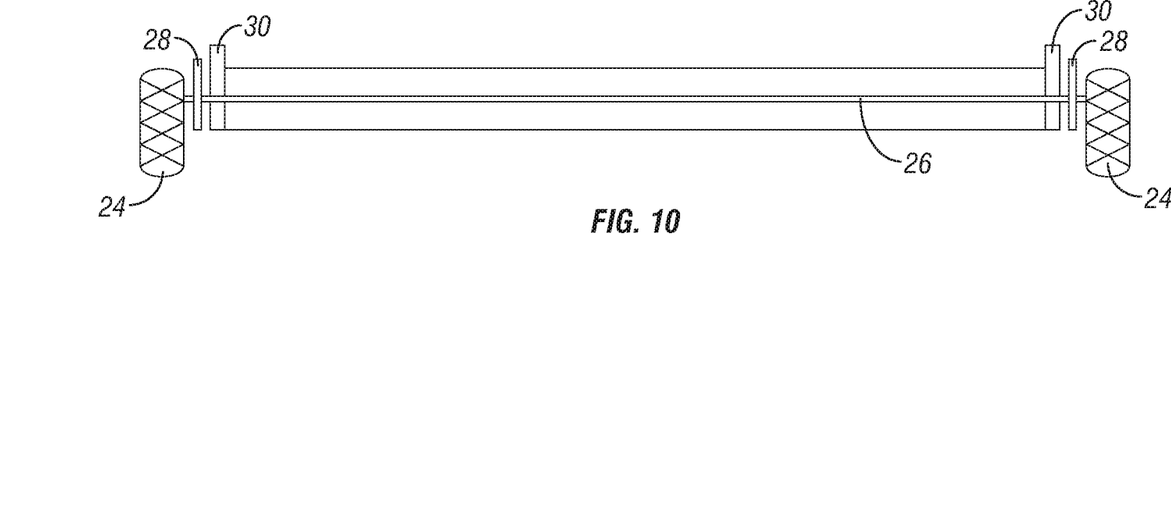
FIG. 10 is a cross-sectional front view of one of the segments of an embodiment of the present invention showing the apparatus' axle housing.

Preferably, front segment 14 and rear segment 16 each comprise at least one wheel 24. Referring to FIG. 10, in a preferred embodiment, each segment comprises two wheels 24 and a mechanism that allows the wheels to have a lowered configuration for assemblage of the dolly 10 around the wheel of a motorcycle or another two-wheeled vehicle, and a lifted configuration for moving the two-wheeled vehicle.

Figure 1:
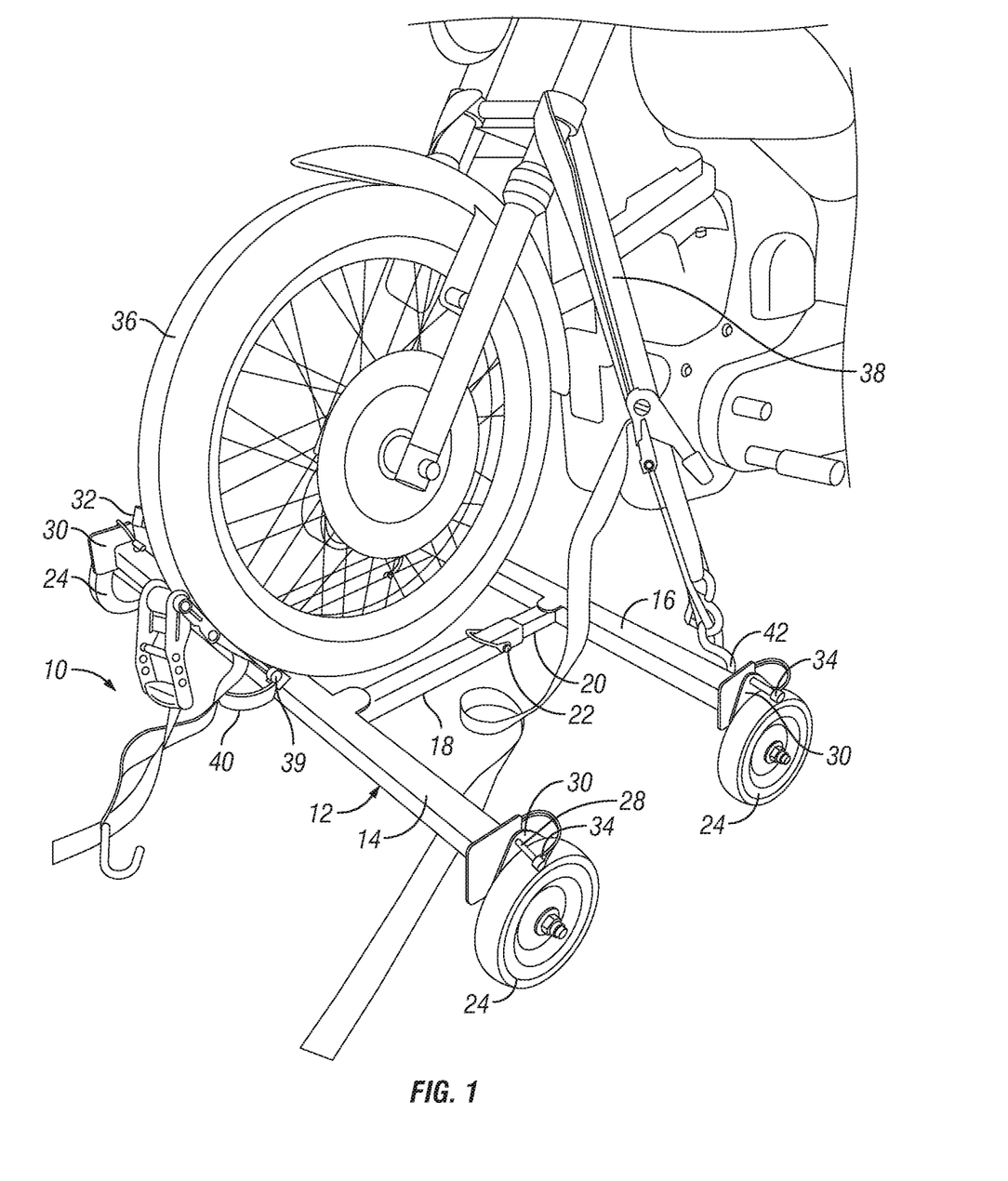
FIG. 1 is a perspective view of an embodiment of the present invention with the front wheel of a motorcycle disposed on it, the motorcycle being partially strapped.
Figure 2:
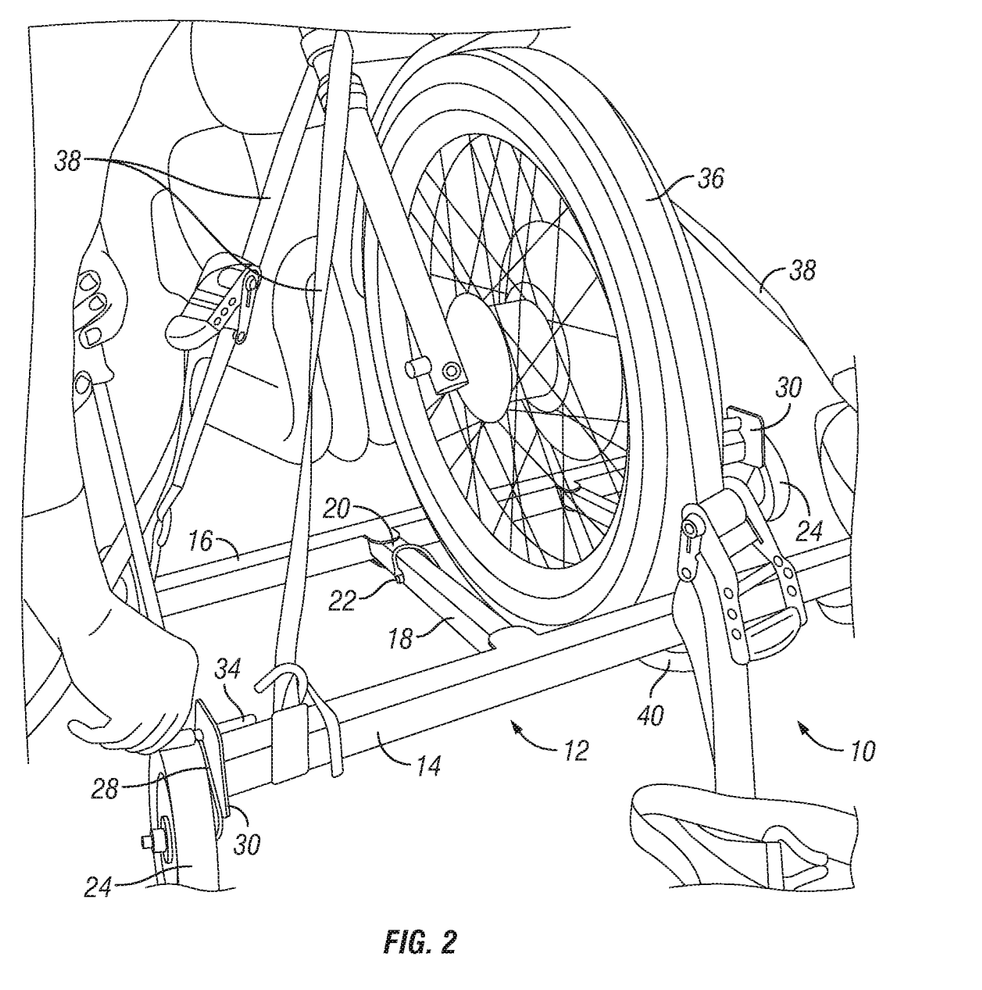
FIG. 2 is another perspective view of the embodiment of FIG. 1 with the motorcycle fully strapped and showing a user holding the apparatus front wheels in a lifted configuration while inserting a lock pin to lock the apparatus in this configuration.
Figure 8:
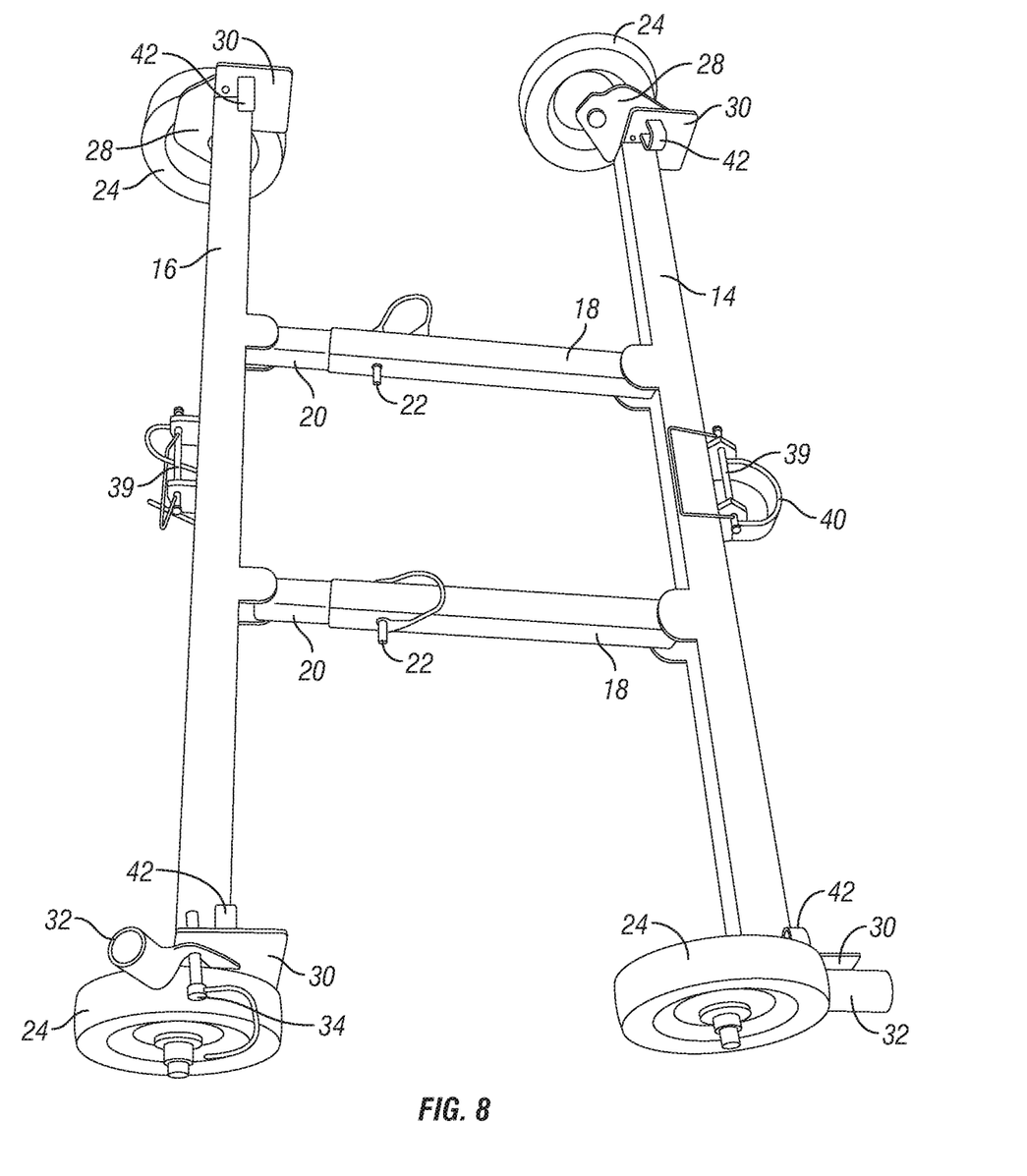
FIG. 8 is a left top perspective view of the apparatus of FIG. 4 with its rear set of wheels locked with lock pins in the lifted configuration.
Figure 9:
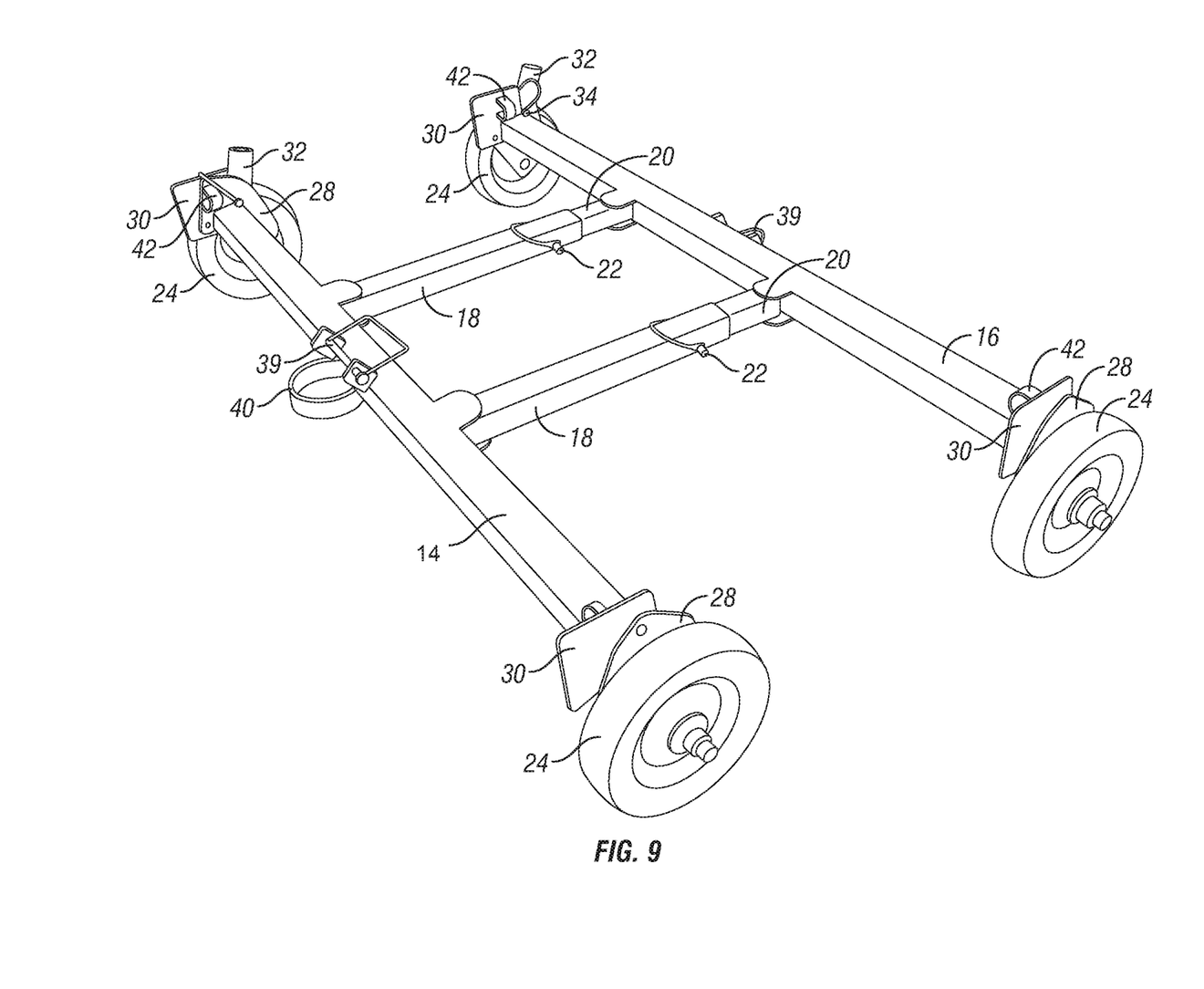
FIG. 9 is a right top perspective view of the apparatus of FIG. 4 with all its wheels in the lifted configuration.

Preferably, the mechanism allows wheels 24 in each segment to switch between lowered and lifted configurations simultaneously for better stability of the two-wheeled vehicle during lifting. Referring to FIG. 10, for example, in one embodiment, front segment 14 and rear segment 16 house axle 26 that connects to rotating wheel hubs 28 as the ends of axle 26 protrude from axle bearings 30. Preferably, rotating wheel hubs 28 comprise socket 32 into which a leverage tool such as metal rod or a screw driver, can be inserted to help switching to the lifted configuration. See FIGS. 2 and 8. Preferably, rotating wheel hubs 28 comprise a mechanism to lock them in their different configurations. For example, pins 34 can be inserted through matching holes axle bearings 30. See FIG. 9. Alternatively, the apparatus comprises an automatic locking mechanism, for example, cam spring locks and the like.

In an alternative embodiment, each wheel comprises means to switch independently between lowered and lifted configurations including but not limited to hydraulic or mechanical means similar to the wide variety of car jacks available.

Figure 3:
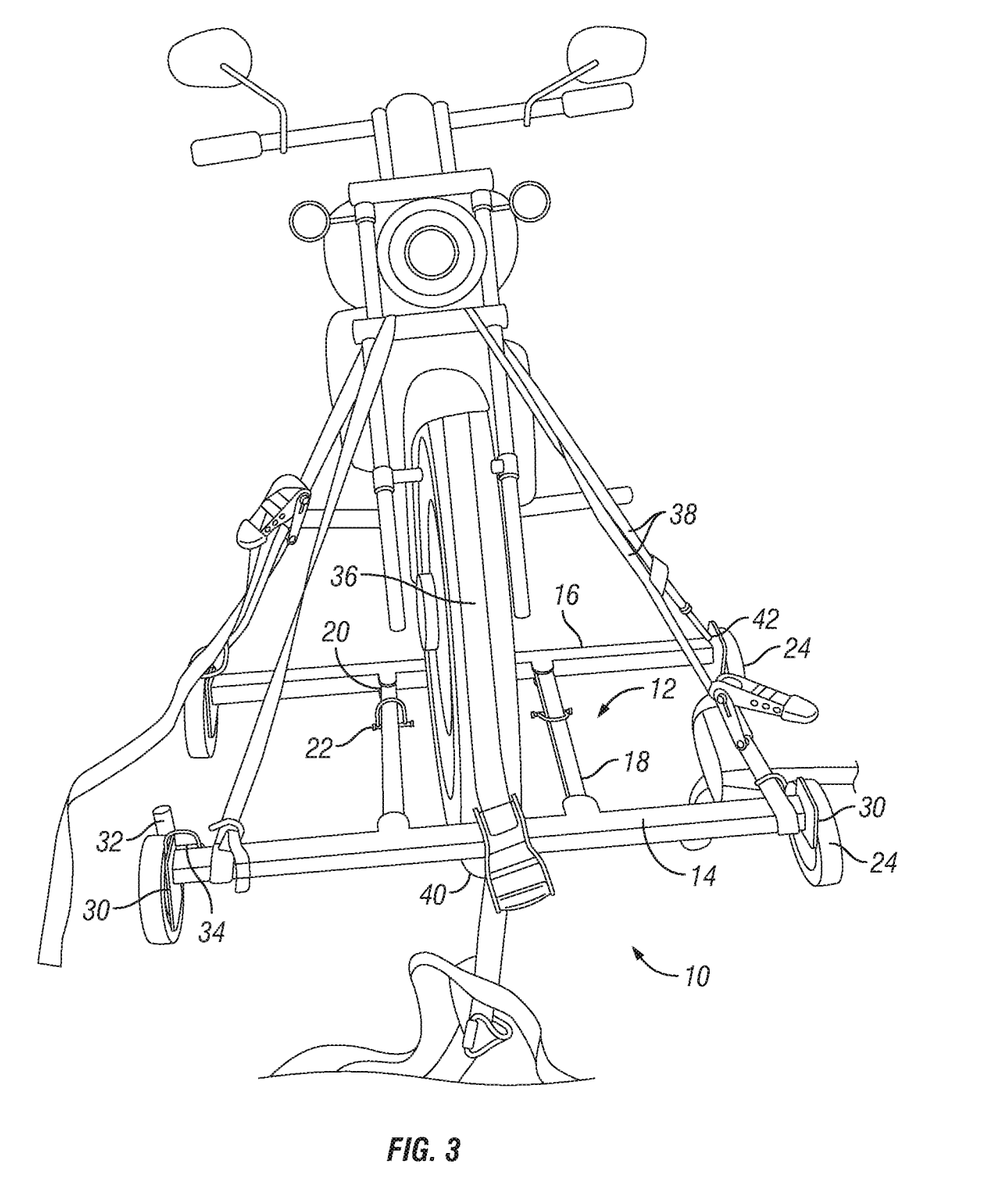
FIG. 3 is a front perspective view of the embodiment of FIG. 1 showing the motorcycle fully strapped and all lock pins in place to lock the apparatus in the lifted configuration.
Figure 4:
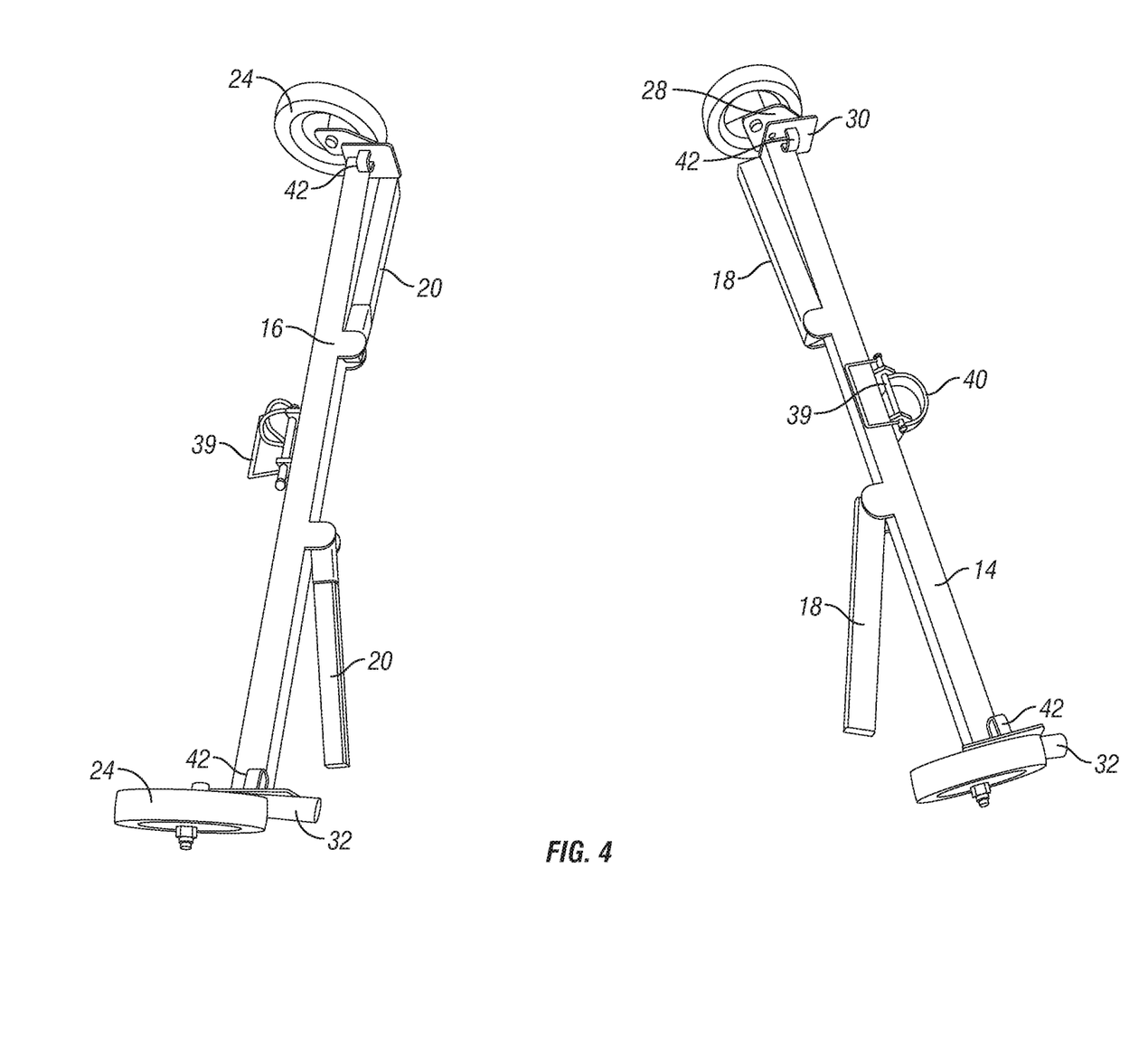
FIG. 4 is a left top perspective view of the embodiment of FIG. 1 in a disassembled state for transportation wherein its front and rear components are separated.
Figure 5:
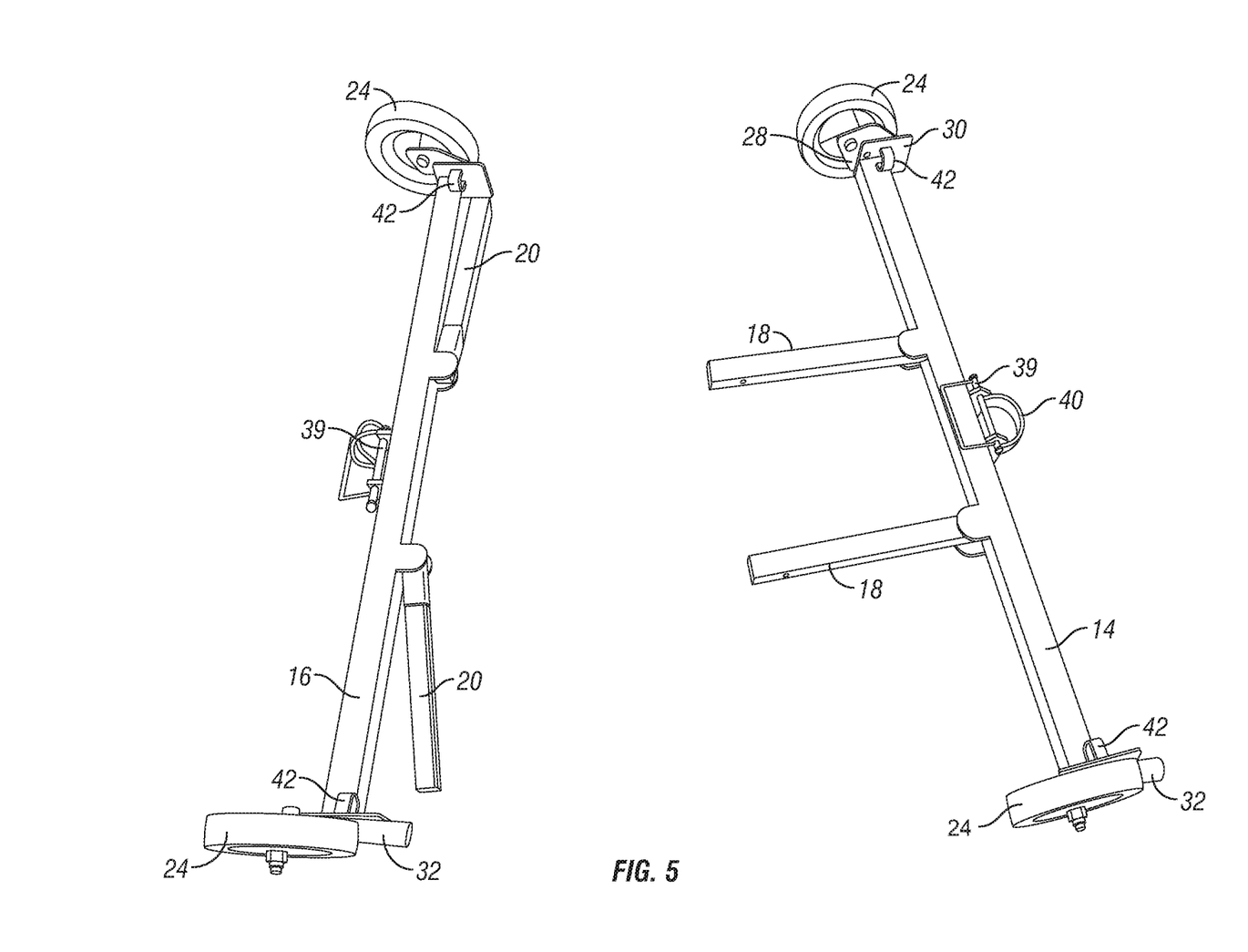
FIG. 5 is a left top perspective view of the apparatus of FIG. 4 wherein the front component has both connecting members fully extended.

Preferably, strap 36 is disposed from back to front or vice versa to secure the vehicle's wheel and one or more straps 38 are used to further stabilize it. See FIG. 3. Preferably, frame 12 comprises means for strap 36 to be secured, for example, square lock pins 39. In a preferred embodiment, towing ring 40 is disposed in the front of front segment 14 so that dolly 10 can be pulled, for example, onto the platform of a tow truck. Preferably, axle bearings 30 comprise rings 42 for optional attachment of straps 38.

Figure 11:
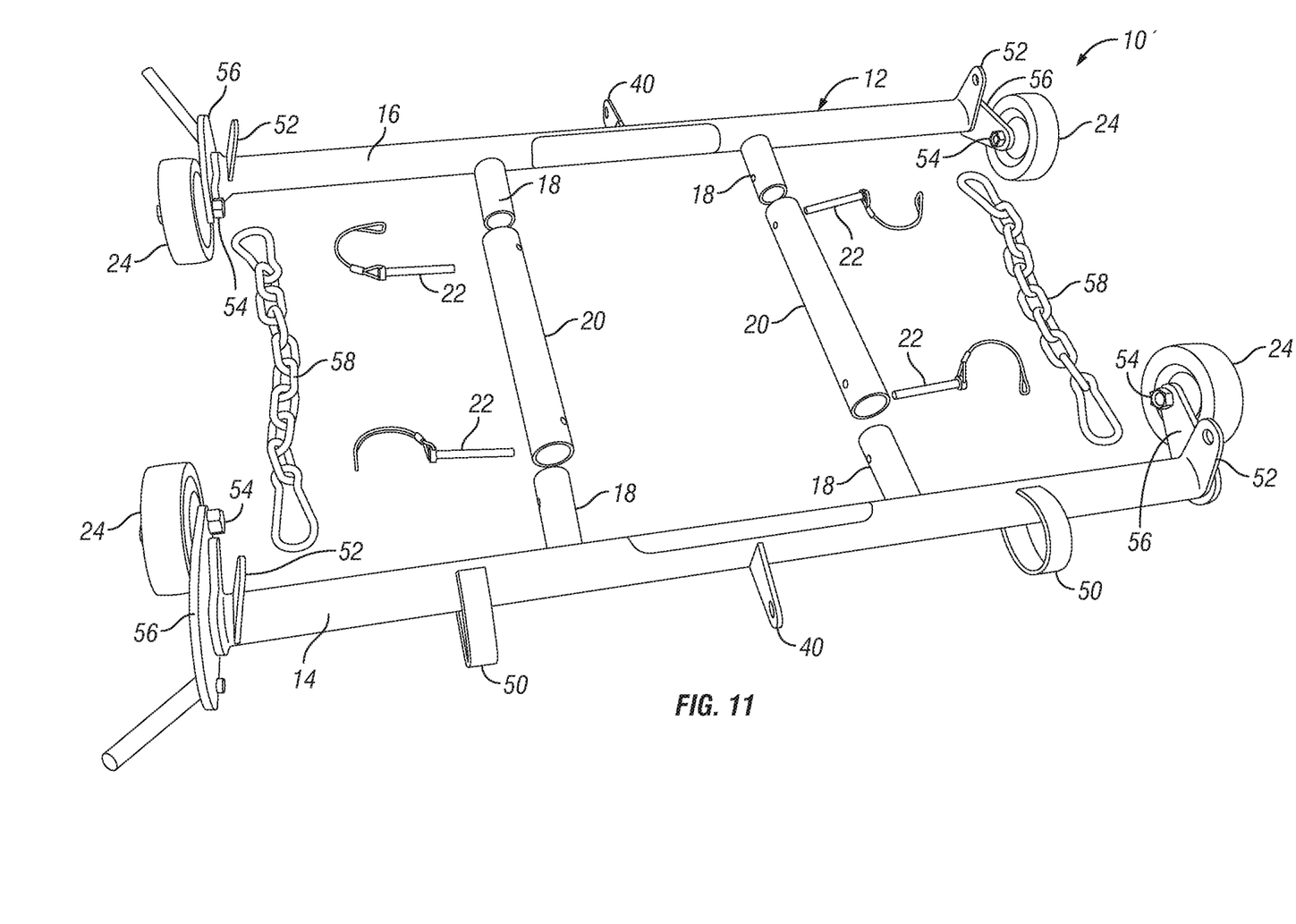
FIG. 11 is a disassembled view of an alternative embodiment of the invention.

FIG. 11 shows an alternative embodiment 10' of the invention, comprising frame 12, front segment 14, rear segment 16, connecting members 18, connecting members 20 (preferably having diameter greater than that of connecting members 18), lock pins 22, wheels 24, strap attachment hoops 50, and tow rings 40. In this embodiment, the wheels are attached 54 directly to tabs 56. The dolly is moved to lifted configuration by attaching chains 58 (or other like connectors) between opposing tabs 52.

Embodiments of the present invention also contemplate methods of safely moving a two-wheeled vehicle. In one embodiment the method comprises assembling a frame of a dolly around a wheel of the vehicle in a lowered configuration, securing the wheel to the frame of the dolly, and switching the dolly to a lifted configuration. In a preferred embodiment, either the front or the back of the dolly is lifted first. Alternatively, both ends are lifted simultaneously. Note that while the invention is particularly useful for two-wheeled motorcycles, it can additionally be useful for three-wheeled vehicles, such as a three-wheeled motorcycle, a two-wheeled motorcycle with a sidecar, etc.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for moving a two-wheeled or three-wheeled vehicle, the method comprising:
    disposing a front frame segment in front of a wheel of the two-wheeled or three-wheeled vehicle;
    disposing a rear frame segment behind the wheel;
    assembling a frame by connecting the front frame segment to the rear frame segment with a first connecting member disposed on a first side of the wheel and a second connecting member disposed on a second side of the wheel;
    securing the two-wheeled or three-wheeled vehicle to the assembled frame;

causing wheels of the assembled frame to descend and thereby lift the wheel of the two-wheeled or three-wheeled vehicle; and moving the two-wheeled or three-wheeled vehicle.

2. The method of claim 1 further comprising attaching at least one chain between opposing tabs that are communicably coupled to the front and rear frame segments.

3. The method of claim 1 wherein securing the two-wheeled or three-wheeled vehicle to the assembled frame comprises attaching one or more connecting members between the frame and the vehicle.

4. The method of claim 3 wherein attaching one or more connecting members between the assembled frame and the two-wheeled or three-wheeled vehicle comprises attaching one or more straps between the assembled frame and the two-wheeled or three-wheeled vehicle.

5. The method of claim 1 wherein moving the two-wheeled or three-wheeled vehicle comprises towing the two-wheeled or three-wheeled vehicle.

6. The method of claim 5 wherein towing the two-wheeled or three-wheeled vehicle comprises pulling on a towing ring of the assembled frame.

7. The method of claim 5 wherein towing the two-wheeled or three-wheeled vehicle comprises pulling the two-wheeled or three-wheeled vehicle onto the platform of a tow truck.

8. The method of claim 1 further comprising securing one or more locking pins after the wheels of the assembled frame have been caused to descend and thereby lift the wheel of the two-wheeled or three-wheeled vehicle.

9. The method of claim 8 wherein securing one or more locking pins comprises securing one or more locking pins that lock the wheels of the assembled frame in a descended position.

10. The method of claim 1 wherein connecting the front frame segment to the rear frame segment comprises folding at least one of the first or second connecting members.

11. The method of claim 1 wherein assembling the frame comprises securing the frame with one or more lock pins.

12. The method of claim 1 wherein connecting the front frame segment to the rear frame segment comprises inserting the first connecting member into or onto a third connecting member and inserting the second connecting member into or onto a fourth connecting member.

13. The method of claim 1 wherein causing wheels of the assembled frame to descend comprises causing wheels of the assembled frame to descend with a levering tool.

14. The method of claim 13 wherein causing wheels of the assembled frame to descend with the levering tool comprises inserting the levering tool into a socket.

* * * * *